US005669236A

United States Patent [19]
Billingham et al.

[11] Patent Number: 5,669,236
[45] Date of Patent: Sep. 23, 1997

[54] CRYOGENIC RECTIFICATION SYSTEM FOR PRODUCING LOW PURITY OXYGEN AND HIGH PURITY OXYGEN

[75] Inventors: John Fredric Billingham, Tonawanda; Michael James Lockett; Dante Patrick Bonaquist, both of Grand Island, all of N.Y.

[73] Assignee: Praxair Technology, Inc., Danbury, Conn.

[21] Appl. No.: 691,963

[22] Filed: Aug. 5, 1996

[51] Int. Cl.⁶ ........................................ F25J 3/04
[52] U.S. Cl. ...................... 62/643; 2/647; 2/654; 2/900
[58] Field of Search ............... 62/646, 654, 643, 62/647, 900

[56] References Cited

U.S. PATENT DOCUMENTS

| | | | |
|---|---|---|---|
| 2,471,134 | 5/1949 | Wright | 196/100 |
| 2,664,719 | 1/1954 | Rice et al. | 62/646 |
| 2,861,432 | 11/1958 | Haselden | 62/646 |
| 3,113,854 | 12/1963 | Bernstein . | |
| 3,210,951 | 10/1965 | Gaumer, Jr. . | |
| 4,715,873 | 12/1987 | Auvil et al. | 62/646 |
| 4,783,210 | 11/1988 | Ayers et al. . | |
| 4,824,453 | 4/1989 | Rottmann et al. | 62/648 |
| 5,049,173 | 9/1991 | Cormier, Sr. et al. | 62/646 |
| 5,195,324 | 3/1993 | Cheung | 62/654 |
| 5,315,833 | 5/1994 | Ha et al. . | |
| 5,339,648 | 8/1994 | Lockett et al. . | |
| 5,349,824 | 9/1994 | Ha et al. . | |
| 5,361,590 | 11/1994 | Rathbone | 62/646 |
| 5,386,692 | 2/1995 | Laforce | 62/646 |
| 5,392,609 | 2/1995 | Girault et al. | 62/646 |
| 5,396,773 | 3/1995 | Ha et al. | 62/646 |
| 5,425,241 | 6/1995 | Agrawal et al. | 62/643 |
| 5,438,835 | 8/1995 | Rathbone | 62/646 |
| 5,490,391 | 2/1996 | Hogg et al. | 62/654 X |

Primary Examiner—Christopher Kilner
Attorney, Agent, or Firm—Stanley Ktorides

[57] ABSTRACT

A cryogenic rectification system employing an additional rectifying section in parallel with the lower section of the lower pressure column of a double column for producing product oxygen at both low and high purity.

8 Claims, 2 Drawing Sheets

CRYOGENIC RECTIFICATION SYSTEM FOR PRODUCING LOW PURITY OXYGEN AND HIGH PURITY OXYGEN

TECHNICAL FIELD

This invention relates generally to the production of oxygen and, more particularly, to the cryogenic rectification of feed air to produce oxygen.

BACKGROUND ART

The demand for low purity oxygen is increasing in applications such as glassmaking, steelmaking and energy production. Low purity oxygen is generally produced in large quantities by the cryogenic rectification of feed air in a double column wherein feed air at the pressure of the higher pressure column is used to reboil the liquid bottoms of the lower pressure column and is then passed into the higher pressure column.

Some users of low purity oxygen, for example integrated steel mills, often require some high purity oxygen in addition to low purity oxygen. Such dual purity production cannot be efficiently accomplished with a conventional low purity oxygen plant.

Accordingly, it is an object of this invention to provide a cryogenic rectification system which can effectively and efficiently produce both low purity oxygen and high purity oxygen.

It is another object of this invention to provide a rectification column which can produce product having two purities, e.g. low purity oxygen and high purity oxygen.

The above and other objects, which will become apparent to those skilled in the art upon a reading of this disclosure, are attained by the present invention, one aspect of which is:

A method for producing high purity oxygen and low purity oxygen comprising:
(A) condensing feed air and passing the resulting feed air into a higher pressure column;
(B) separating the feed air within the higher pressure column by cryogenic rectification into oxygen-enriched liquid and nitrogen-enriched vapor;
(C) passing oxygen-enriched liquid from the higher pressure column into a lower pressure column having a first product portion and a second product portion separated by a longitudinally oriented partition;
(D) processing oxygen-enriched liquid in each of the first product portion and the second product portion of the lower pressure column by cryogenic rectification and producing high purity oxygen in the first product portion and low purity oxygen in the second product portion;
(E) reboiling the first product portion by the said condensing feed air and reboiling the second product portion by condensing nitrogen-enriched vapor from the higher pressure column; and
(F) recovering high purity oxygen from the first product portion and recovering low purity oxygen from the second product portion.

Another aspect of the invention is:

Apparatus for producing high purity oxygen and low purity oxygen comprising:
(A) a first column;
(B) a second column having a column section comprising a first product portion and a second product portion separated by a longitudinally oriented partition;
(C) a first reboiler located within the first product portion, and a second reboiler located within the second product portion;
(D) means for passing feed air into the first reboiler and from the first reboiler into the first column;
(E) means for passing fluid from the lower portion of the first column into the second column and means for passing fluid from the upper portion of the first column into the second reboiler; and
(F) means for recovering high purity oxygen from the first product portion and means for recovering low purity oxygen from the second product portion.

A further aspect of the invention is:

A rectification column for producing first product and second product comprising:
(A) a column section having a partition longitudinally oriented within the column section which divides the column section into a first product portion and a second product portion;
(B) a first reboiler located within the first product portion;
(C) a second reboiler located within the second product portion;
(D) means for passing feed into the column above at least some of the column section;
(E) means for withdrawing first product from the column section proximate the first reboiler; and
(F) means for withdrawing second product from the column section proximate the second reboiler.

Yet another aspect of the invention is:

method for producing high purity oxygen and low purity oxygen comprising:
(A) condensing feed air and passing the resulting condensed feed air into a higher pressure column;
(B) separating the feed air within the higher pressure column by cryogenic rectification into oxygen-enriched liquid and nitrogen-enriched vapor;
(C) passing oxygen-enriched liquid from the higher pressure column into a lower pressure column and producing low purity oxygen by cryogenic rectification within the lower pressure column;
(D) withdrawing oxygen-containing fluid from the lower pressure column and passing it into an auxiliary column, and producing high purity oxygen by cryogenic rectification within the auxiliary column;
(E) reboiling the auxiliary column by the said condensing feed air and reboiling the lower pressure column by condensing nitrogen-enriched vapor from the higher pressure column; and
(F) recovering high purity oxygen from the lower portion of the auxiliary column and recovering low purity oxygen from the lower portion of the lower pressure column.

As used herein, the term "feed air" means a mixture comprising primarily oxygen and nitrogen, such as ambient air.

As used herein, the term "low purity oxygen" means a fluid having an oxygen concentration with the range of from 50 to 99 mole percent.

As used herein, the term "high purity oxygen" means a fluid having an oxygen concentration greater than 99 mole percent.

As used herein, the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*. The term, double column is used to mean a higher pressure column having its upper end in heat exchange relation with the lower end of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Partial condensation is the separation process whereby cooling of a vapor mixture can be used to concentrate the volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases is generally adiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein, the term "indirect heat exchange" means the bringing of two fluid streams into heat exchange relation without any physical contact or intermixing of the fluids with each other.

As used herein the term "reboiler" means a heat exchange device which generates column upflow vapor from column liquid.

As used herein, the term "reboiling" means vaporizing column liquid by indirect heat exchange with cooling and/or condensing fluid.

As used herein, the terms "turboexpansion" and "turboexpander" mean respectively method and apparatus for the flow of high pressure gas through a turbine to reduce the pressure and the temperature of the gas thereby generating refrigeration.

As used herein, the terms "upper portion" and "lower portion" of a column or column portion mean those sections of the column or column portion respectively above and below the mid point of the column or column portion.

As used herein, the term "structured packing" means packing wherein individual members have specific orientation relative to each other and to the column axis.

As used herein, the term "equilibrium stage" means a vapor-liquid contacting stage whereby the vapor and liquid leaving the stage are in mass transfer equilibrium, e.g. a tray having 100 percent efficiency or a packing element height equivalent to one theoretical plate (HETP).

As used herein, the term "longitudinally oriented" means in the direction of the major axis of the column.

As used herein, the terms "liquid to vapor ratio" and "L/V" mean the ratio of the quantity of liquid flow down a column to the quantity of vapor rising in the column.

DETAILED DESCRIPTION

In general, the invention comprises an additional stripping section in parallel with the lower section or stripping section of the lower pressure column of a double column low purity oxygen plant. The additional stripping section processes oxygen-containing liquid and is reboiled by higher pressure feed air. The additional stripping section is operated at a lower liquid to vapor ratio and/or with a greater number of equilibrium stages than is the stripping section of the lower pressure column and accordingly produces high purity oxygen by the cryogenic rectification of the oxygen-containing liquid. In a particularly preferred embodiment, the additional stripping section is housed within the lower pressure column, partitioned from the low purity oxygen stripping section.

Figure 1:
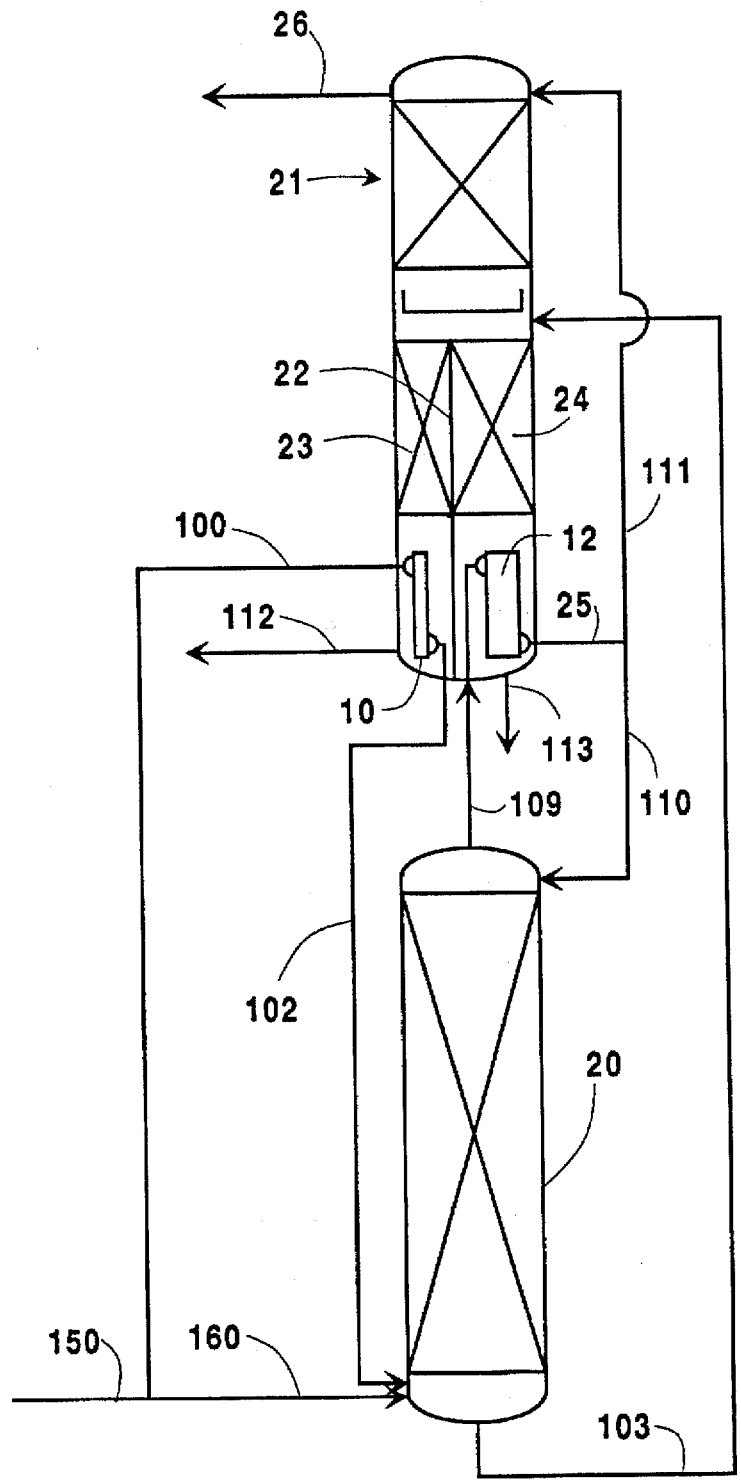
FIG. 1 is a simplified schematic representation of one preferred embodiment of the invention.

The invention will be described in greater detail with reference to the Drawings. Referring now to FIG. 1, feed air 150, which has been cleaned of high boiling impurities such as water vapor and carbon dioxide, and which is at an elevated pressure generally within the range of from 60 to 150 pounds per square inch absolute (psia), is divided into first portion 100 and second portion 160. First portion 100 is passed into first reboiler 10 wherein it is at least partially condensed by indirect heat exchange with bottom liquid as will be more fully described below. Resulting condensed feed air 102 is passed into first or higher pressure column 20 which is part of a double column system which also comprises second or lower pressure column 21. Second feed air portion 160 is passed directly into higher pressure column 20.

Higher pressure column 20 is operating at a pressure generally within the range of from 60 to 150 psia. Within the higher pressure column the feed air is separated by cryogenic rectification into oxygen-enriched liquid and nitrogen-enriched vapor. Oxygen-enriched liquid, which generally has an oxygen concentration within the range of from 30 to 55 mole percent, is passed from the lower portion of higher pressure column 20 in stream 103 and fed into lower pressure column 21.

Lower pressure column 21 is operating at a pressure less than that of higher pressure column 20 and generally within the range of from 15 to 35 psia. Lower pressure column 21 has a longitudinally oriented partition 22 which defines a column section comprising a first product portion 23 and a second product portion 24. First reboiler 10 is located in the lower portion of first product portion 23. Second reboiler 12 is located in the lower portion of second product portion 24. Oxygen-enriched liquid 103 is fed into lower pressure column 21 above at least some of the partitioned column section. Preferably, as illustrated in FIG. 1, oxygen-enriched liquid 103 is fed into lower pressure column 21 above all of the partitioned column section, i.e. at or above the top of the partitioned column section.

The oxygen-enriched liquid is passed down in parallel through each of first product portion 23 and second product portion 24 against upflowing vapor and in the process is separated by cryogenic rectification to form high purity oxygen and low purity oxygen respectively. The first product portion is operated at a lower liquid to vapor ratio and/or has a greater number of equilibrium stages than the second product portion enabling the production of the higher purity product. Preferably the column internals, i.e. the mass transfer elements, within first product portion 23 and second product portion 24 comprise structured packing.

High purity oxygen liquid pools at the bottom of first product portion 23 and is reboiled by the aforesaid at least partially condensing feed air 100 to produce upflowing vapor within first product portion 23. Product high purity oxygen is recovered as liquid and/or gas from the first product portion 23 proximate first reboiler 10. In the embodiment illustrated in FIG. 1, high purity oxygen is withdrawn from first product portion 23 as liquid in stream 112 and recovered.

Low purity oxygen liquid pools at the bottom of second product portion 24 and is reboiled by condensing nitrogen-enriched vapor 109 taken from the upper portion of higher pressure column 20 to produce upflowing vapor within second product portion 24. Product low purity oxygen is recovered as liquid and/or gas from second product portion 24 proximate second reboiler 12. In the embodiment illustrated in FIG. 1, low purity oxygen is withdrawn from second product portion 24 as liquid in stream 113 and recovered. Condensed nitrogen-enriched fluid is withdrawn from second reboiler 12 as liquid stream 25. A first portion 110 of stream 25 is passed into higher pressure column 20 as reflux and a second portion 111 of stream 25 is passed into second column 21 as reflux. A nitrogen-containing stream 26 is withdrawn from the upper portion of second column 21 and may be recovered as product nitrogen.

Figure 2:
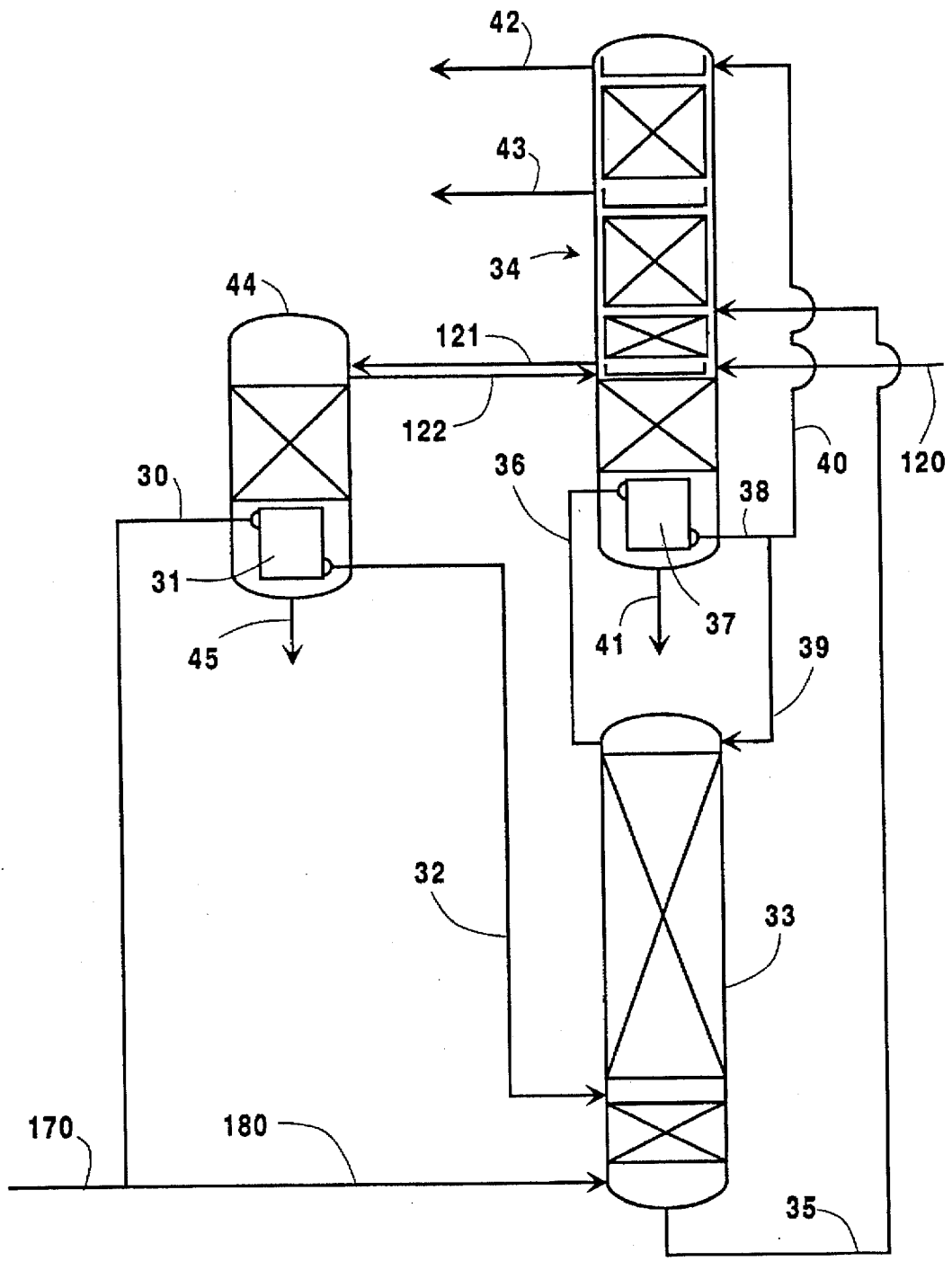
FIG. 2 is a simplified schematic representation of another preferred embodiment of the invention.

FIG. 2 illustrates another embodiment of the invention wherein the additional parallel stripping section for producing high purity oxygen is located in a separate auxiliary column. Referring now to FIG. 2, feed air 170, which has been cleaned of high boiling impurities such as water vapor and carbon dioxide, and which is at an elevated pressure generally within the range of from 60 to 150 psia, is divided into first portion 30 and second portion 180. First portion 30 is passed into auxiliary column reboiler 31 wherein it is at least partially condensed by indirect heat exchange with bottom liquid as will be more fully described below. Resulting condensed feed air 32 is passed into first or higher pressure column 33 which is part of a double column system which also comprises second or lower pressure column 34. Second feed air portion 180 is passed directly into higher pressure column 33.

Higher pressure column 33 is operating at a pressure generally within the range of from 60 to 150 psia. Within higher pressure column 33 the feed air is separated by cryogenic rectification into oxygen-enriched liquid and nitrogen-enriched vapor. Oxygen-enriched liquid, which generally has an oxygen concentration within the range of from 30 to 55 mole percent is passed from the lower portion of higher pressure column 33 in stream 35 into lower pressure column 34 which is operating at a pressure less than that of higher pressure column 34 and generally within the range of from 15 to 35 psia. Nitrogen-enriched vapor is passed from the upper portion of higher pressure column 33 in stream 36 into lower pressure column reboiler 37 wherein it is condensed by indirect heat exchange with lower pressure column bottom liquid. Resulting nitrogen-enriched liquid 38 is divided into first portion 39 which is passed into higher pressure column 33 as reflux, and into second portion 40 which is passed into lower pressure column 34 as reflux. Also passed into column 34 is additional feed air stream 120 which has been turboexpanded to generate refrigeration.

Within lower pressure column 34 the feeds are separated by cryogenic rectification into low purity oxygen and nitrogen-rich vapor. The low purity oxygen pools as liquid at the bottom of lower pressure column 34 and is reboiled by condensing nitrogen-enriched vapor 36. Product low purity oxygen is recovered as liquid and/or vapor from the lower portion of lower pressure column 34. In the embodiment illustrated in FIG. 2, low purity oxygen is withdrawn from column 34 as liquid in stream 41 and recovered. Nitrogen-rich vapor is withdrawn from the upper portion of column 34 as stream 42 and may be recovered as product nitrogen. A waste stream is also withdrawn from column 34 below the top of the column for product purity control purposes.

An oxygen-containing liquid stream 121, having an oxygen concentration generally within the range of from 50 to 95 mole percent, is withdrawn from lower pressure column 34 and passed into the upper portion of third or auxiliary column 44 and is separated within column 44 by cryogenic rectification into high purity oxygen and remaining vapor. Auxiliary column 44 operates at a pressure generally within the range of from 17 to 35 psia. Auxiliary column 44 is operated at a lower liquid to vapor ratio and/or has a greater number of equilibrium stages than does the section of lower pressure column 34 below the withdrawal point of stream 121. High purity oxygen liquid pools at the bottom of auxiliary column 44 and is reboiled by the aforesaid at least partially condensing feed air 30. Product high purity oxygen is recovered as liquid and/or gas from auxiliary column 44. In the embodiment illustrated in FIG. 2, high purity oxygen is withdrawn from auxiliary column 44 as liquid in stream 45 and recovered. Remaining vapor is withdrawn from the upper portion of auxiliary column 44 and passed in stream 122 into the lower pressure column 34.

Now by the use of this invention one can effectively produce both high purity oxygen and low purity oxygen from a cryogenic air separation plant. Although the invention has been described in detail with reference to two preferred embodiments, those skilled in the art will recognize that there are other embodiments of the invention within the spirit and the scope of the claims. For example, the partitioned column may have more than one partition and the partitioned section may contain more than two product portions each with its own reboiler. In this way three or more oxygen products may be produced at different purity levels.

We claim:

1. A method for producing high purity oxygen and low purity oxygen comprising:

(A) condensing feed air and passing the resulting feed air into a higher pressure column;

(B) separating the feed air within the higher pressure column by cryogenic rectification into oxygen-enriched liquid and nitrogen-enriched vapor;

(C) passing oxygen-enriched liquid from the higher pressure column into a lower pressure column having a first product portion and a second product portion separated by a longitudinally oriented partition;

(D) processing oxygen-enriched liquid in each of the first product portion and the second product portion of the lower pressure column by cryogenic rectification and producing high purity oxygen in the first product portion and low purity oxygen in the second product portion;

(E) reboiling the first product portion by the said condensing feed air and reboiling the second product portion by condensing nitrogen-enriched vapor from the higher pressure column; and (F) recovering high purity oxygen from the first product portion and recovering low purity oxygen from the second product portion.

2. The method of claim 1 wherein the liquid to vapor ratio in the first product portion is lower than the liquid to vapor ratio in the second product portion.

3. Apparatus for producing high purity oxygen and low purity oxygen comprising:

(A) a first column;

(B) a second column having a column section comprising a first product portion and a second product portion separated by a longitudinally oriented partition;

(C) a first reboiler located within the first product portion, and a second reboiler located within the second product portion;

(D) means for passing feed air into the first reboiler and from the first reboiler into the first column;

(E) means for passing fluid from the lower portion of the first column into the second column and means for passing fluid from the upper portion of the first column into the second reboiler; and (F) means for recovering high purity oxygen from the first product portion and means for recovering low purity oxygen from the second product portion.

4. The apparatus of claim 3 wherein the first product portion has more equilibrium stages than the second product portion.

5. A rectification column for producing first product and second product comprising:

(A) a column section having a partition longitudinally oriented within the column section which divides the column section into a first product portion and a second product portion;

(B) a first reboiler located within the first product portion;

(C) a second reboiler located within the second product portion;

(D) means for passing feed into the column above at least some of the column section;

(E) means for withdrawing first product from the column section proximate the first reboiler; and (F) means for withdrawing second product from the column section proximate the second reboiler.

6. The rectification column of claim 5 wherein the first product portion has more equilibrium stages than the second product portion.

7. The rectification column of claim 5 wherein the said column section has mass transfer elements which comprise structured packing.

8. The rectification column of claim 5 further comprising at least one additional partition longitudinally oriented within the column section to define at least one additional product portion having a reboiler, and means for withdrawing product from each of said additional product portions.

* * * * *